United States Patent

Nishitani

[11] Patent Number: 5,933,662
[45] Date of Patent: Aug. 3, 1999

[54] FRAME COUNTING METHOD AND DEVICE IN CAMERA

[75] Inventor: Yasuhiro Nishitani, Asaka, Japan

[73] Assignee: Fuji Photo Film Co., Ltd., Kangawa, Japan

[21] Appl. No.: 08/746,780

[22] Filed: Nov. 15, 1996

[30] Foreign Application Priority Data

Nov. 17, 1995 [JP] Japan ................................ 7-300091

[51] Int. Cl.$^6$ ................................................. G03B 1/66
[52] U.S. Cl. ............................................................. 396/284
[58] Field of Search ................................. 396/284, 409, 396/410, 281

[56] References Cited

U.S. PATENT DOCUMENTS

| | | | |
|---|---|---|---|
| 3,206,758 | 9/1965 | Inglis | 352/172 |
| 4,707,095 | 11/1987 | Nakano et al. | 354/173.11 |
| 5,032,858 | 7/1991 | Kobayashi et al. | 354/173.1 |
| 5,107,290 | 4/1992 | Ohsawa | 354/173.1 |
| 5,500,705 | 3/1996 | Stephenson, III | 354/288 |
| 5,517,270 | 5/1996 | Balling | 354/288 |
| 5,655,162 | 8/1997 | Nakamura et al. | 396/284 |

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

The time after film is rewound up to a first frame until a film cartridge holding the film is allowed to be taken out is divided with the time required for rewinding the film by the currently-exposed frames. A delayed frame number is displayed at the time which is delayed from a time when the actual frame corresponding to the delayed frame number has been rewound for a delay time which is found based upon a number of the currently-exposed frames. Thus, a time in which a displayed number "1" changes to such a mark as "E" can be decreased, thereby preventing the user from opening a film cartridge chamber before the film is completely rewound.

21 Claims, 6 Drawing Sheets

FRAME COUNTING METHOD AND DEVICE IN CAMERA

BACKGROUND OF THE INVENTION

1. Field of the Invention

The present invention relates to frame counting method and device in a camera. More particularly, the present invention pertains to a frame counting method and device in a camera which is applied to a camera which records, onto film or in a film cartridge, the data on photographing conditions such as whether the film has any unexposed frames or not.

2. Description of the Related Art

In the case of photographing ordinary 35 mm film, if the photographing for all frames on the film is over, or if the rewinding of the film is directed while the film is being exposed, the rewinding of the film starts automatically.

In the process of rewinding the film, a frame counter displays frame numbers, decreasing the number one by one every time the film is rewound frame by frame. After the leader of the film is wound in a few seconds, the frame counter displays such marks as "E" (representing Empty).

There is proposed a new type of a film cartridge as shown in FIG. 6. This film cartridge 10 has a single spool 12, and film 14 is wound around the spool 12. A perforation 14A is formed on the film 14 to indicate a position of each frame, and a magnetic recording layer 14B is formed on the entire back surface of the film 14 or at the edge of the film 14. Information about each frame can be recorded onto the magnetic recording layer 14B.

The aforementioned film cartridge 10 is able to wind up all unexposed film, film being exposed, undeveloped film, and developed film into the film cartridge 10. Although not shown in FIG. 6, a light-shielding lid is provided at a film slot of the film cartridge 10 so as to prevent the film 14 within the film cartridge 10 from being exposed.

In a camera using the aforementioned film cartridge 10, if the photographing for all frames on the film 14 is over, or if the rewinding of the film 14 is directed while the film 14 is being exposed, the rewinding of the film 14 starts. If the whole film has been rewound into the film cartridge 10, the light-shielding lid of the film cartridge 10 is closed, and the information indicating whether the film 14 has any unexposed frames or not is recorded onto a recognition means provided in the film cartridge 10. Then, the film cartridge 10 can be taken out of the film cartridge chamber of the camera.

For the reasons stated above, as shown in FIG. 7, the time $t_2$ is required for rewinding the film leader, closing the light-shielding lid, and recording the aforementioned information after the frame counter displays "1" until the frame counter displays "E", and the frame counter displays "---" during the time $t_2$. Because the time $t_2$ is a long period of 10 seconds, there is a possibility that a user determines that the rewinding has been completed (the film cartridge is allowed to be taken out) in the time $t_2$, and that the user may open a film cartridge chamber carelessly to thereby expose the film to the outside light.

SUMMARY OF THE INVENTION

The present invention has been developed in view of the above-described circumstances, and has its object the provision of a frame counting method and device in a camera which provides counter displays, preventing a misconception about the time to take out the film cartridge, even if the film cartridge requires a lot of time for rewinding the film leader, closing the light-shielding lid, and recording the photographic information.

In order to achieve the above-mentioned object, a frame counting method in a camera, which comprises, at the start of rewinding photographic film, displaying number $n_{exp}$ of currently-exposed frames on the film on a display means, and displaying display numbers which are decreased one by one from the number $n_{exp}$ on the display means while the film is being rewound, comprises the steps of: at the start of rewinding, finding a delay time $t_{dly}$ which is defined as $$t_{dly} = t_2/n_{exp},$$

where $t_2$ is a time after all frames on the film are rewound until a film cartridge holding the film is allowed to be taken out; and displaying the display numbers one by one on the display means at intervals of a time which is found by adding the delay time $t_{dly}$ to a time required for rewinding the film one frame at a time.

According to the present invention, the relatively-long period in which the displayed number "1" changes to such marks as "E" appears to be divided with the time after the number of currently-exposed frames is displayed until the number "1" is displayed (that is, the interval at which the displayed numbers are changed one by one is longer than the interval at which the film is rewound frame by frame.) Thus, an interval at which the displayed number "1" changes to such marks as "E" can be equal to the intervals at which the displayed numbers are sequentially counted to thereby prevent the user from opening the film cartridge chamber carelessly.

BRIEF DESCRIPTION OF THE DRAWINGS

The nature of this invention, as well as other objects and advantages thereof, will be explained in the following with reference to the accompanying drawings, in which like reference characters designate the same or similar parts Throughout the figures and wherein.

DETAILED DESCRIPTION OF THE PREFERRED EMBODIMENTS

Figure 1:
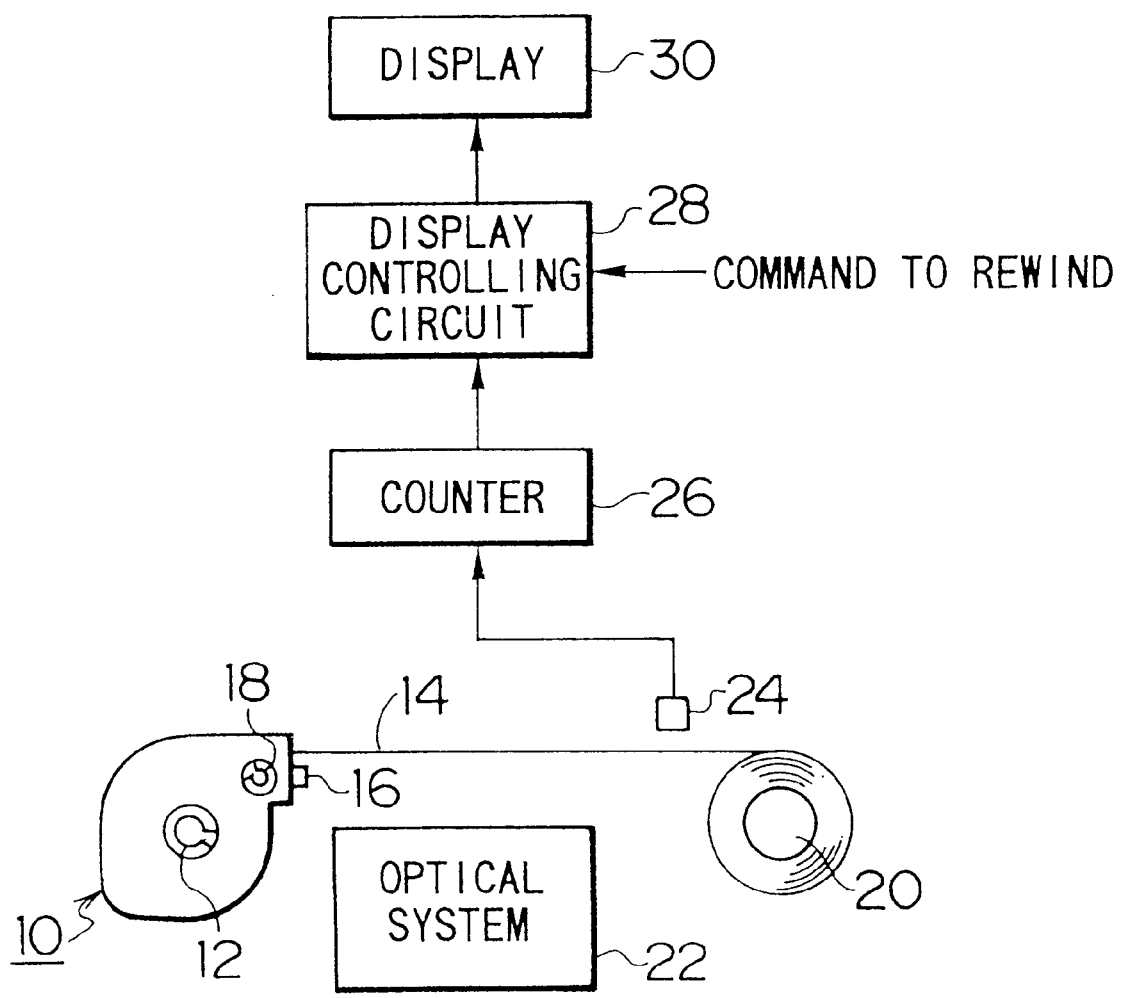
FIG. 1 is a block diagram of a camera provided with a display device according to the present invention.

FIG. 1 is a block diagram illustrating the essential parts of a camera provided with a display device according to the present invention. In FIG. 1, reference numeral 10 is a film cartridge mounted in a film cartridge chamber of the camera; 20 is a windup spool for winding up film 14 transported from the spool 12 of the film cartridge 10; and 22 is an optical system including a taking lens, a shutter, etc. Reference numeral 16 is a light-shielding lid at a film slot of the film cartridge 10, and 18 is a lid opening and closing member, which is rotated so as to open and close the light-shielding lid 16.

Figure 6:
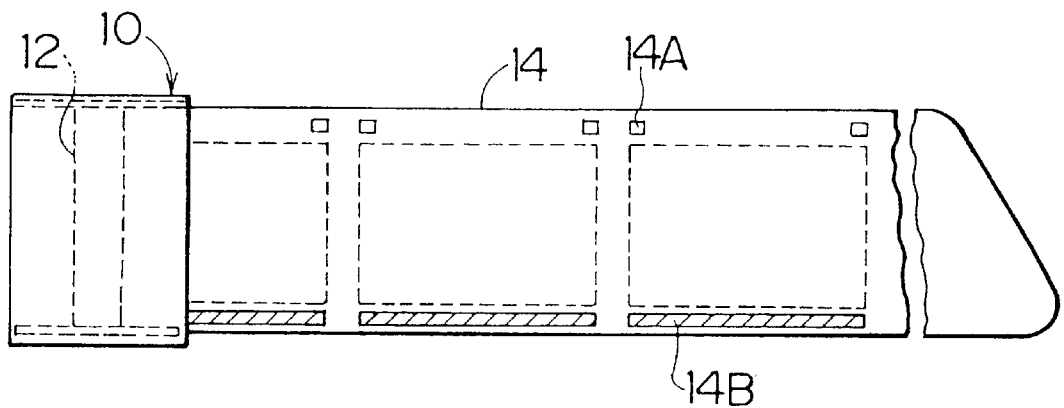
FIG. 6 is a view showing one example of a film cartridge applied to a camera according to the present invention.

The camera has functions of automatically winding and rewinding the film. In photographing, one frame is wound according to a frame detection signal transmitted from a perforation sensor 24. That is, the perforation sensor 24 outputs the frame detection signal every time it detects the perforation 14A (see FIG. 6) on the film 14. A feed controlling means (not shown) controls the feeding and stopping of the film 14 according to the frame detection signal when one frame is wound.

The frame detection signal from the perforation sensor 24 is supplied to a counter 26. The counter 26 is an up-down counter which counts the frame detection signal every time it is output from the perforation sensor 24, and the counter 26 outputs the counted value, which corresponds to a number $n_{exp}$ of exposed frames on the film, to the display 30 such as a liquid crystal display (LCD) via a display controlling circuit 28. Thereby, the number $n_{exp}$ is displayed on the display 30.

Incidentally, during photographing, a number of unexposed frames on the film may be displayed instead of the number $n_{exp}$. In this case, the counter 26 outputs a number which is found by subtracting the number $n_{exp}$ from the number of all frames on the film to the display 30. Thereby, the number of unexposed frames is displayed on the display 30.

On the other hand, if the photographing for all frames on the film is over, or if the rewinding of the film is directed while the film is being exposed, a central processing unit (CPU) of the camera (not shown) outputs a command to rewind the film, and the rewinding of the film starts automatically. While the film is automatically rewound, the counter 26 counts the frame detection signals every time they are output from the perforation sensor 24, and the display controlling circuit 28 executes the later-described display control according to the present invention.

Next, a theoretical explanation will be given about the display control according to the present invention when the film is rewound.

Figure 7:
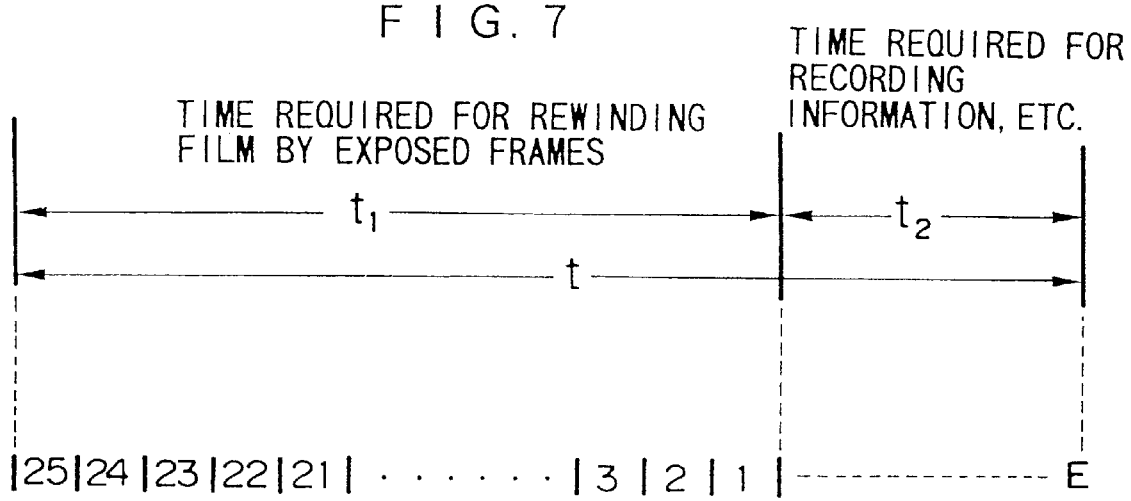
FIG. 7 is a view showing the conventional counter displays while film is being rewound.

Supposing that the rewinding starts when the number $n_{exp}$ of exposed frames is 25, as shown in FIG. 7, the shortest time t from the rewinding starts until the film cartridge 10 is allowed to be taken out is a total of a time $t_1$, which is required for rewinding of 25 frames, and a time $t_2$, which is required for rewinding the leader of the film 14, closing the light-shielding lid 16 of the film cartridge 10, and recording the information indicating whether the film 14 has any unexposed frames or not.

In the present invention, the time $t_2$ appears to be divided in the time $t_1$. That is, the time at which a frame number is displayed is delayed from the time when the actual frame corresponding to the delayed frame number has been rewound for a delay time $t_{dly}$ which is defined as $$t_{dly}=t_2/n_{exp}. \quad (1)$$

Thus, the time required for rewinding each frame appears to be longer than the original one by the delay time $t_{dly}$. After the delayed frame number "1" is displayed, the display can be changed to "E" at the same display switching timing.

Figure 3:
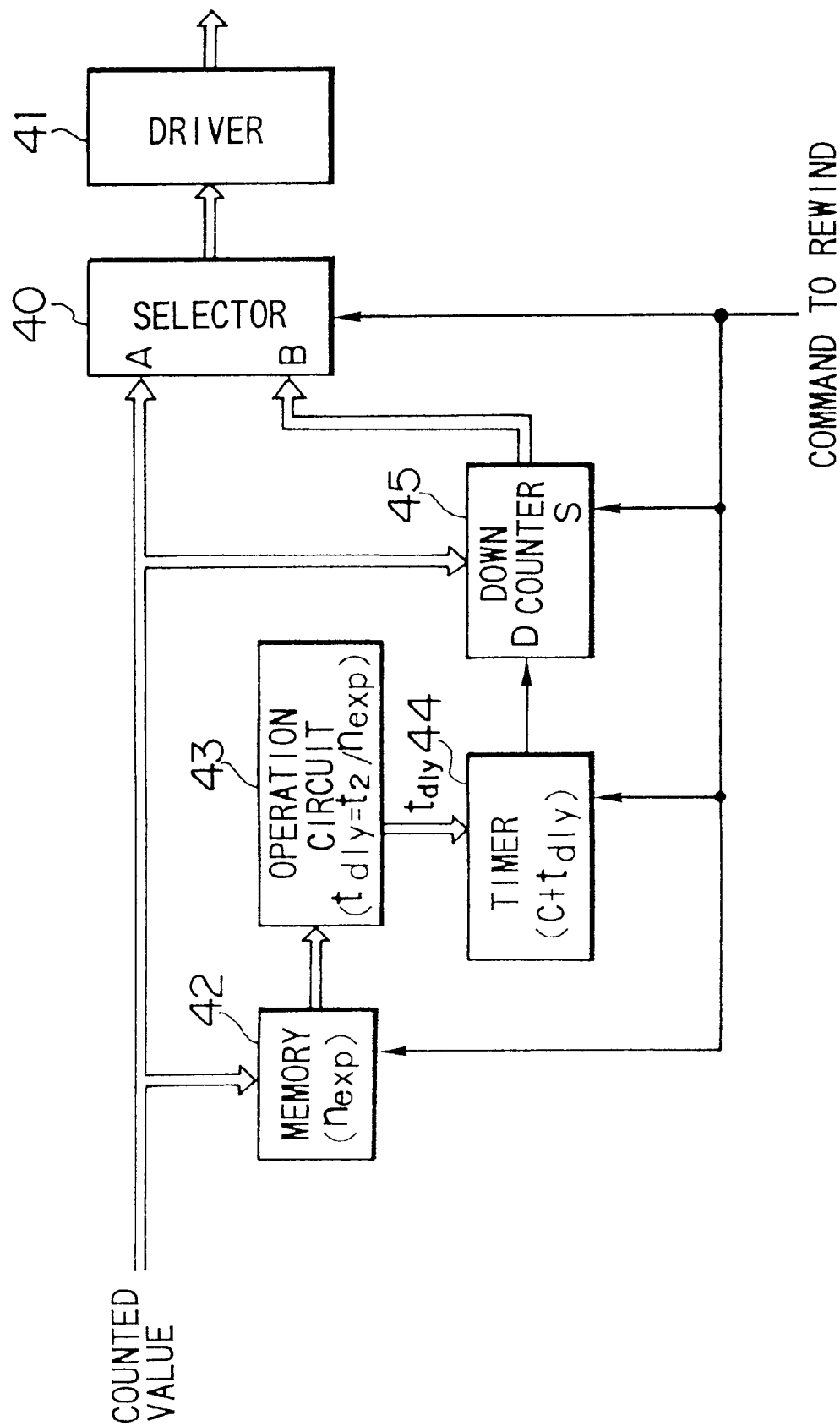
FIG. 3 is a block diagram of an example of a display controlling circuit in FIG 1.

FIG. 3 is a block diagram of one example of the display controlling circuit 28 in FIG. 1.

As shown in FIG. 3, the display controlling circuit 28 consists of a selector 40, a driver 41, a memory 42, an operation circuit 43, a timer 44, and a down counter 45.

The selector 40 has a terminal A for receiving the counted value from the counter 26, and a terminal B for receiving the counted value from the down counter 45. During photographing, the selector 40 selects the terminal A, and outputs the counted value which is supplied from the counter 26 (that is, the value corresponds to the number $n_{exp}$ of exposed frames) to the display 30 via the driver 41. Thereby, the number $n_{exp}$ is displayed on the display 30.

On the other hand, when the CPU outputs the command to rewind the film, the selector 40 selects the terminal B and outputs the counted value which is supplied from the down counter 45 to the display 30 via the driver 41, and the memory 42 stores the number $n_{exp}$. The timer 44 starts checking time in a predetermined manner after receiving the command to rewind, and the number $n_{exp}$ is set in the down counter 45 when the command to rewind is transmitted to an S terminal of the down counter 45.

The operation circuit 43 executes the operation of the above equation (1) based upon the number $n_{exp}$ stored in the memory 42 in order to find the delay time $t_{dly}$. The time $t_2$ which is intrinsic to the camera, is set in the operation circuit 43 in advance.

After receiving the command to rewind, the timer 44 outputs pulse signals to a terminal D of the down counter 45 at intervals of a time $t_{int}$ which is found by adding the delay time $t_{dly}$ to a predetermined time C, which is required for rewinding the film one frame at a time and is a constant time depending on the film rewind speed. The down counter 45 decreases the counted value one by one from the number $n_{exp}$ every time the pulse signal is supplied to the terminal D from the timer 44, and the counted value corresponds to the delayed frame number as a result. Thereby, the down counter 45 outputs the delayed frame number to the terminal B of the selector 40.

Figure 2:
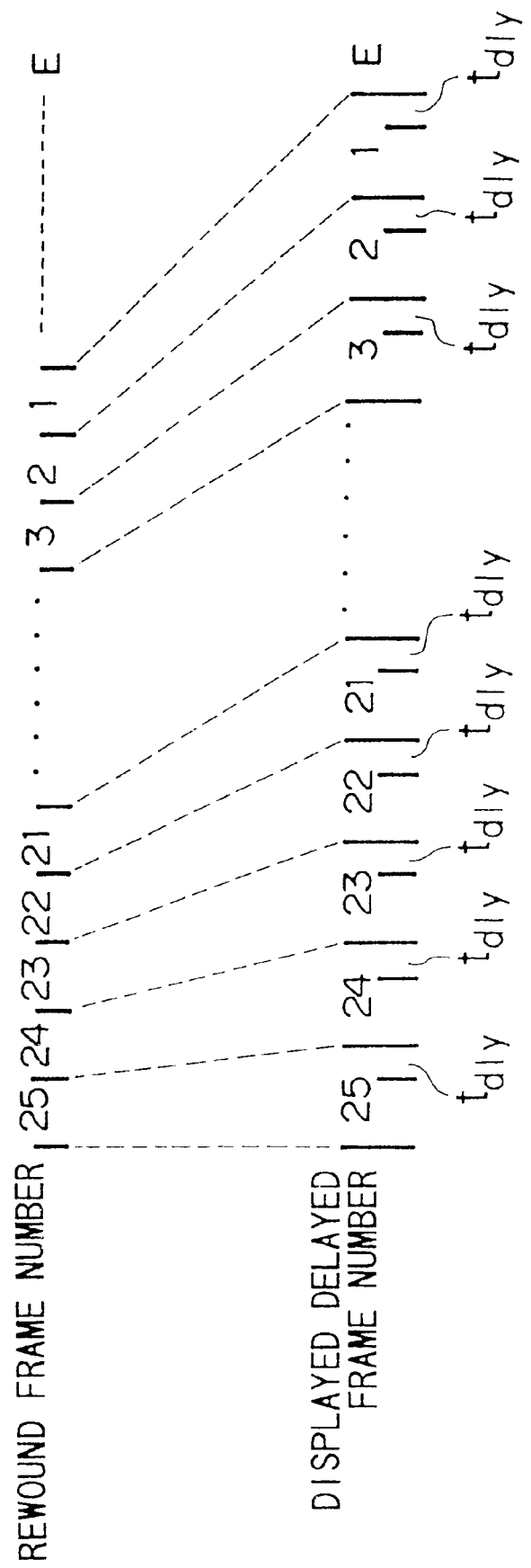
FIG. 2 is a view showing counter displays according to the present invention.

When the film is rewound, the selector 40 selects the terminal B and outputs the counted value, which is supplied from the down counter 45, to the display 30. For this reason, the display 30 displays the delayed frame number, which is found by decreasing one by one from the number $n_{exp}$ every time the above-mentioned time $t_{int}$ passes, and the displayed frame number differs from the counted value in the counter 26 as shown in FIG. 2, and "E" is displayed immediately after the delayed frame number "1" is displayed.

In this embodiment, while the film is rewound, the delayed frame number is counted to be displayed independently of the frame detection signal from the perforation sensor 24. The delayed frame number, however, may also be displayed in connection with the frame detection signal.

Figure 4:
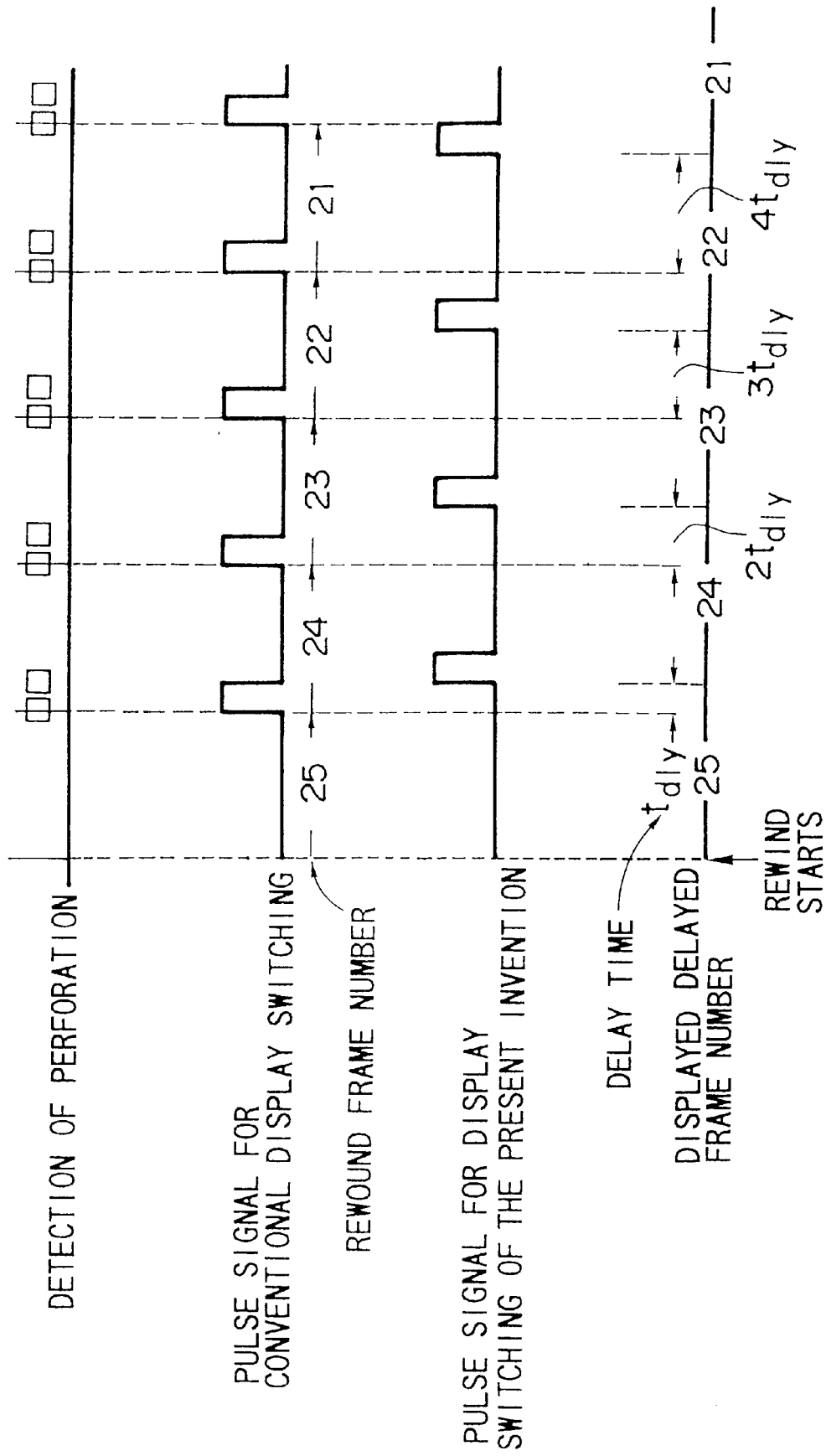
FIG. 4 is a view showing counter displays according to the present invention.

That is, as shown in FIG. 4, the conventional pulse signal for display switching corresponds to the frame detection signal in view of time. In this embodiment, however, the pulse signals for display switching are sequentially delayed by $t_{dly}$, $2t_{dly}$, $3t_{dly}$, . . . .

Figure 5:
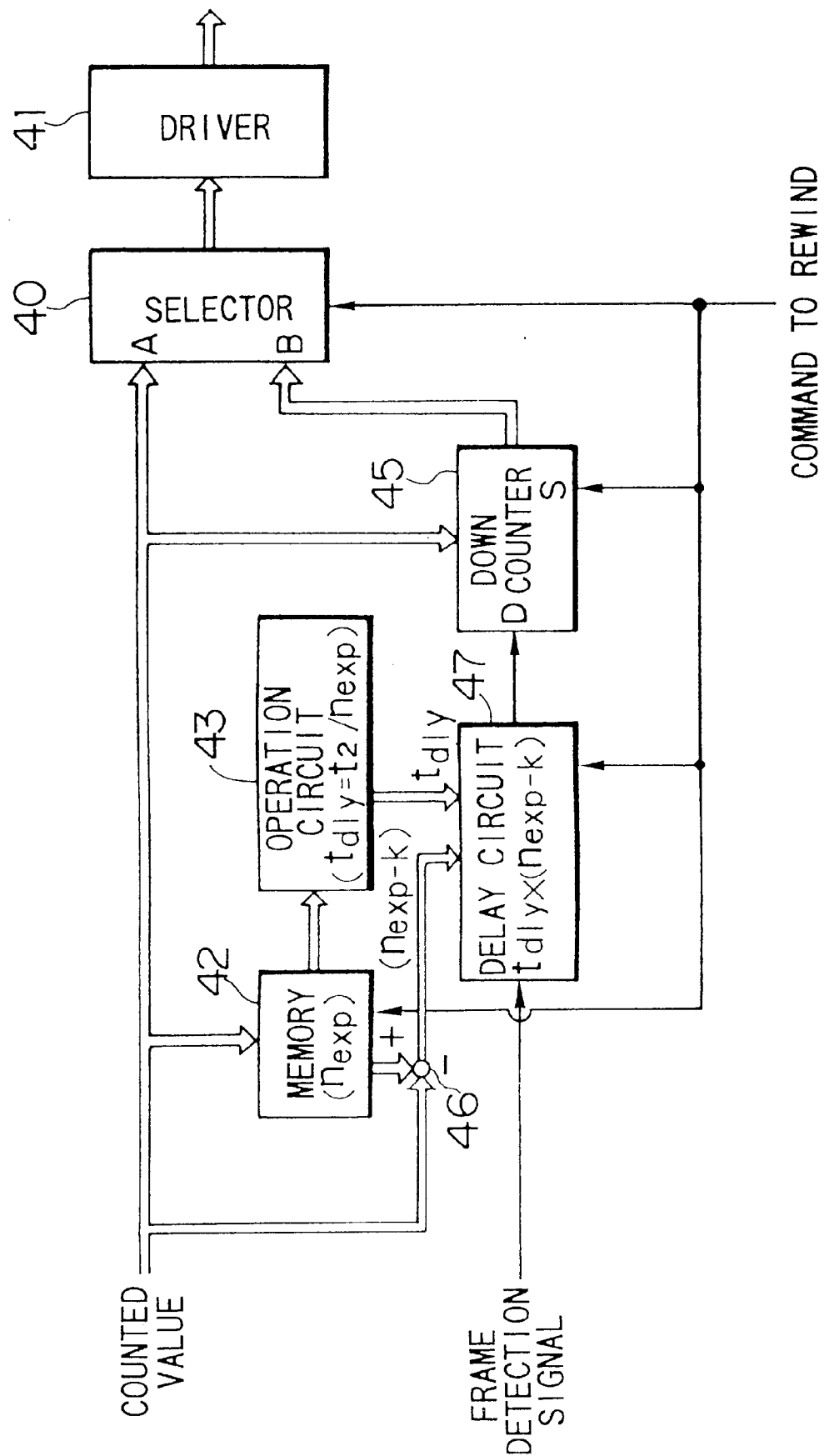
FIG. 5 is a block diagram showing another example of a display controlling circuit in FIG. 1.

FIG. 5 is a block diagram of another example of the display controlling circuit 28 in FIG. 1. Parts similar to those described with reference to FIG. 3 are denoted by the same reference numerals, and they will not be explained.

If compared with FIG. 3, a subtracter 46 is additionally provided in FIG. 5, and a delay circuit 47 for delaying the frame detection signal is provided instead of the timer 44. The subtracter 46 subtracts the counted value k, which is output from the counter 26 (FIG. 1), from the $n_{exp}$ stored in the memory 42, and the subtracter 46 outputs the subtracted value $(n_{exp}-k)$, which corresponds to a number $n_{rwd}$ of frames which have been rewound in the rewinding process, to the delay circuit 47. The number $n_{rwd}$ is 0 when the rewinding starts, and increases one by one every time the film is rewound frame by frame.

The delay circuit 47 delays the frame detection signal output from the perforation sensor 24 for a time which is found by multiplying the delay time $t_{dly}$, which is found by the operation circuit 43 (refer to the equation (1)), by the number $n_{rwd}$, which is found by the subtracter 46. The delay circuit 47 delays the input frame detection signal for the multiplied time $n_{rwd}t_{dly}$, and outputs the delayed signal as the pulse signal for display switching. That is, every time the delay circuit 47 receives the frame detection signal, it delays the frame detection signal for $t_{dly}$, $2t_{dly}$, $3t_{dly}$, ... and outputs the signal as the pulse signal for display switching to the down counter 45.

The down counter 45 decreases the counted value one by one from the $n_{exp}$, which is set at the receiving of the command to rewind, every time it receives the pulse signal from the delay circuit 47, and the counted value consequently corresponds to the delayed frame number. Then, the down counter 45 outputs the delayed frame number to the terminal B of the selector 40. When the film is rewound, the selector 40 selectively outputs the counted value supplied to the terminal B, so that the delayed frame number can be displayed on the display 30.

In this embodiment, the counted value is counted at intervals of a time which is found by adding a delay time, which is found by dividing a time $t_2$ after all frames on the film are rewound until the film cartridge is allowed to be taken out by the number $n_{exp}$ of currently-exposed frames on the film at the start of rewinding, to a time required for rewinding the film one frame at a time. The present invention, however, is not restricted to this. For example, the counted value 10 may be counted at intervals of a time which is found by adding a delay time, which is found by dividing the time $t_2$ by 10, to the time required for rewinding the film one frame at a time. In this case, the intervals at which the counted value 10 is counted become longer after the middle of rewinding (tenth frame), and it seems as if the film rewind speed become lower However, the object can be achieved.

Moreover, the intervals at which the counted value is counted are not always regular. For example, the intervals become longer or shorter as the film is rewound, and 0 or E may be displayed when the film cartridge is allowed to be taken out. Furthermore, it takes much time to rewind the leader section of the 35 mm film into the film cartridge after the first frame is rewound. For this reason, the display of the counted value may be delayed.

As set forth hereinabove, according to the frame counting method and device according to the present invention, the time after the film is rewound up to the first frame until the film cartridge is allowed to be taken out appears to be divided with the time required for rewinding the film by the exposed frames. The delayed frame number is displayed, delayed from the time when the actual frame corresponding to the delayed frame number has been rewound. Thus, the time in which the displayed number "1" changes to "E" can be decreased, thereby preventing the user from opening the film cartridge chamber carelessly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A frame counting method in a camera, which comprises, at the start of rewinding a photographic film, displaying a number of currently-exposed frames on said film on a display, and displaying display numbers which are decreased one by one from said number of currently-exposed frames on said display while said film is being rewound, said frame counting method comprising the step of:

decreasing said display numbers, which are displayed during said rewinding, at greater time intervals than a time interval when passage of one frame is detected during rewinding of said film and said display numbers are correspondingly decreased one by one.

2. The frame counting method in the camera as defined in claim 1, wherein after the whole film is wound by a film cartridge, said display numbers are decreased one by one until all film-related operations are completed in said film cartridge.

3. The frame counting method in the camera as defined in claim 2, wherein said film cartridge has a light-shielding lid which is closed after the whole film is wound up by said film cartridge, and decreasing of said display numbers is stopped when said light-shielding lid is closed.

4. A frame counting method in a camera, which comprises, at the start of rewinding a photographic film, displaying a number $n_{exp}$ of currently-exposed frames on said film on a display, and displaying display numbers which are decreased one by one from said number $n_{exp}$ on said display while said film is being rewound, said frame counting method comprising the steps of:

finding a delay time $t_{dly}$ at the start of rewinding, which is defined as $$t_{dly}=t_2/n_{exp};$$

where $t_2$ is a time after all frames on said film are rewound until all film-related operations are completed in a film cartridge holding said film; and displaying said display numbers one by one on said display at intervals of a time which is found by adding said delay time $t_{dly}$ to a time required for rewinding said film one frame at a time.

5. The frame counting method in the camera as defined in claim 4, further comprising the step of:

displaying during photographing, either one of a number of exposed frames and a number of unexposed frames on said display.

6. The frame counting method in the camera as defined in claim 4, further comprising the step of:

informing a user by means of said display, that all film-related operations are completed in said film cartridge.

7. The frame counting method in the camera as defined in claim 4, further comprising the step of:

informing a user that all film-related operations are completed in said film cartridge by displaying a mark "E" on said display.

8. The frame counting method in the camera as defined in claim 4, wherein said film cartridge has a light-shielding lid and comprises recognition means on which photographic conditions of said film such as whether said film has either one of unexposed frames and exposed frames is recorded, and $t_2$ includes a time required for closing said light-shielding lid and recording said photographic conditions.

9. A frame counting method in a camera, which comprises, at the start of rewinding a photographic film, displaying a number $n_{exp}$ of currently-exposed frames on said film on a display, and displaying display numbers which are decreased one by one from said number $n_{exp}$ on said display while said film is being rewound, said frame counting method comprising the steps of:

finding a delay time $t_{dly}$ at the start of rewinding, which is defined as $$t_{dly}=t_2/n_{exp},$$

where $t_2$ is a time after all frames on said film are rewound until all film-related operations are completed in a film cartridge holding said film; and during said rewinding, counting a number $n_{rwd}$ of frames on said film which frames have been rewound by said rewinding, and displaying a display number, which is found by subtracting said number $n_{rwd}$ from said number $n_{exp}$, on said display at a time $T_{dsp}$ which is defined as $$T_{dsp}=T_{rwd}+n_{rwd}t_{dly},$$

where $T_{rwd}$ is a time when said number $n_{rwd}$ is counted.

10. The frame counting method in the camera as defined in claim 9, further comprising the step off:

displaying during photographing, either one of a number of exposed frames and a number of unexposed frames on said display.

11. The frame counting method in the camera as defined in claim 9, further comprising the step of:

informing a user by means of said display, that all film-related operations are completed in said film cartridge.

12. A frame counting method in a camera, which comprises, at the start of rewinding a photographic film, displaying a number $n_{exp}$ of currently-exposed frames on said film on a display, and displaying display numbers which are decreased one by one from said number $n_{exp}$ on said display while said film is being rewound, said frame counting method comprising the steps of:

finding an interval $t_{int}$ at the start of rewinding, which is defined as $$t_{int}=(t_1+t_2)/n_{exp},$$

where $t_1$ is a time after rewinding starts until all frames on said film are rewound, and $t_2$ is a time after all frames on said film are rewound until all film-related operations are completed in a film cartridge holding said film; and displaying said display numbers one by one on said display at intervals of $t_{int}$.

13. A frame counting device in a camera, wherein at the start of rewinding a photographic film, a number $n_{exp}$ of currently-exposed frames on said film is displayed on a display, and display numbers which are decreased one by one from said number $n_{exp}$ are displayed on said display while said film is being rewound, said frame counting device comprising:

means for controlling said display, said control means comprising:

a memory for storing a time $t_2$, where $t_2$ is a time after all frames on said film are rewound until all film-related operations are completed in a film cartridge holding said film;

means for operating said display, said operation means which, at the start of rewinding, finds a delay time $t_{dly}$ which is defined as $$t_{dly}=t_2/n_{exp},$$

and means for checking time at intervals of a time which is found by adding said delay time $t_{dly}$ to a time required for rewinding said film one frame at a time, said display numbers on said display being decreased one by one based on each of said time intervals provided by said timing means.

14. The frame counting device in the camera as defined in claim 13, wherein, during photographing, either one of a number of exposed frames and a number of unexposed frames is displayed on said display.

15. The frame counting device in the camera as defined in claim 13, wherein said display informs a user that all film-related operations are completed in said film cartridge.

16. The frame counting device in the camera as defined in claim 13, wherein when all film-related operations are completed in said film cartridge, a mark "E" is displayed on said display.

17. The frame counting device in the camera as defined in claim 13, wherein said film cartridge has a light-shielding lid and comprises recognition means on which photographic conditions of said film such as whether said film has either one of unexposed frames and exposed frames is recorded, and $t_2$ includes a time required for closing said light-shielding lid and recording said photographic conditions.

18. A frame counting device in a camera, wherein at the start of rewinding a photographic film, a number $n_{exp}$ of currently-exposed frames on said film is displayed on a display, and display numbers which are decreased one by one from said number $n_{exp}$ are displayed on said display while said film is being rewound, said frame counting device comprising:

means for controlling said display, said control means comprising:

a memory for storing a time $t_2$, where $t_2$ is a time after all frames on said film are rewound until all film-related operations are completed in a film cartridge holding said film;

means for operating said display, said operation means which, at the start of rewinding, finds a delay time $t_{dly}$ which is defined as $$t_{dly}=t_2/n_{exp};$$

means for counting, during said rewinding, a number $n_{rwd}$ of frames on said film which have been rewound by said rewinding, and finding a display number by subtracting said number $n_{rwd}$ from said number $n_{exp}$;

means for checking a display time $T_{dsp}$ which is defined as $$T_{dsp}=T_{rwd}+n_{rwd}t_{dly},$$

where $T_{rwd}$ is a time when said number $n_{rwd}$ is counted; and wherein said display number found by said counting means is displayed on said display by said operation means at said display time $T_{dsp}$ provided by said timing means.

19. The frame counting device in the camera as defined in claim 18, wherein, during photographing, either one of a number of exposed frames and a number of unexposed frames is displayed on said display.

20. The frame counting device in the camera as defined in claim 18, wherein said display informs a user that all film-related operations are completed in said film cartridge.

21. A frame counting device in a camera, wherein at the start of rewinding a photographic film, a number $n_{exp}$ of currently-exposed frames on said film is displayed on a display, and display numbers which are decreased one by one from said number $n_{exp}$ are displayed on said display while said film is being rewound, said frame counting device comprising:

means for controlling said display, said control means comprising:

a memory for storing a time $t_2$, where $t_2$ is a time after all frames on said film are rewound until all film-related operations are completed in a film cartridge holding said film;

means for operating said display;

means for checking time, which, at the start of rewinding, finds an interval $t_{int}$ which is defined as $$t_{int}=(t_1+t_2)/n_{exp},$$

where $t_1$ is a time after rewinding starts until all frames on said film are rewound; and wherein said display numbers on said display are displayed by said operation means at intervals of $t_{int}$ provided by said timing means.

* * * * *

UNITED STATES PATENT AND TRADEMARK OFFICE
CERTIFICATE OF CORRECTION

PATENT NO. : 5,933,662
DATED : August 3, 1999
INVENTOR(S) : Yasuhiro Nishitani

It is certified that error appears in the above-identified patent and that said Letters Patent is hereby corrected as shown below:

Title page, item [73] Assignee: change the spelling of the residence of Assignee from "Kangawa" to --Kanagawa--.

Signed and Sealed this

Second Day of May, 2000

Attest:

Q. TODD DICKINSON

*Attesting Officer*      *Director of Patents and Trademarks*